(12) United States Patent
Feng et al.

(10) Patent No.: US 10,373,105 B2
(45) Date of Patent: Aug. 6, 2019

(54) SYSTEM AND METHOD FOR ITEM-LEVEL DEMAND FORECASTS USING LINEAR MIXED-EFFECTS MODELS

(71) Applicant: Wal-Mart Stores, Inc., Bentonville, AR (US)

(72) Inventors: Huijun Feng, San Francisco, CA (US); Shubhankar Ray, Union City, CA (US); Abhay Jha, Burlingame, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 785 days.

(21) Appl. No.: 14/622,252

(22) Filed: Feb. 13, 2015

(65) Prior Publication Data

US 2016/0239776 A1    Aug. 18, 2016

(51) Int. Cl.
*G06Q 10/00*    (2012.01)
*G06Q 10/08*    (2012.01)
*G06Q 10/06*    (2012.01)
*G06Q 30/02*    (2012.01)

(52) U.S. Cl.
CPC ..... *G06Q 10/087* (2013.01); *G06Q 10/06315* (2013.01); *G06Q 30/0201* (2013.01); *G06Q 30/0202* (2013.01); *Y04S 10/54* (2013.01)

(58) Field of Classification Search
None
See application file for complete search history.

(56) References Cited

U.S. PATENT DOCUMENTS

| | | | | |
|---|---|---|---|---|
| 7,668,761 B2 * | 2/2010 | Jenkins | ............... | G06Q 10/087 705/28 |
| 8,666,848 B1 * | 3/2014 | Polsky | .................. | G06Q 10/08 705/28 |
| 2002/0188499 A1 * | 12/2002 | Jenkins | .................. | G06Q 10/06 705/3 |
| 2004/0148217 A1 * | 7/2004 | Lauring | ........... | G06Q 10/06314 705/7.24 |
| 2007/0016496 A1 * | 1/2007 | Bar | ..................... | G06Q 10/087 705/28 |

* cited by examiner

*Primary Examiner* — Gurkanwaljit Singh
(74) *Attorney, Agent, or Firm* — Bryan Cave Leighton Paisner LLP

(57) ABSTRACT

A system and method for forecasting sales is presented. A method might begin by receiving a request to produce a demand forecast for a stock keeping unit (SKU). Then, the SKU is placed in one or more clusters. A cluster seasonality profile is calculated for each of the one or more clusters. An item seasonality profile is calculated for the SKU. Then the demand forecast for the SKU is generated. The demand forecast is adjusted using the cluster seasonality profile for each of the one or more clusters and the item seasonality profile for the SKU. Then inventory can be ordered based on the adjusted demand forecast. Other embodiments are also disclosed herein.

21 Claims, 5 Drawing Sheets

SYSTEM AND METHOD FOR ITEM-LEVEL DEMAND FORECASTS USING LINEAR MIXED-EFFECTS MODELS

TECHNICAL FIELD

This disclosure relates generally to forecasting, and relates more particularly to forecasting sales for a retail business.

BACKGROUND

A retail business typically needs to stock items in a warehouse or store in order to sell the items. Storing too few of a particular item can be undesirable because if the item becomes sold out, then the retail business is not able to sell the item until it is in stock again. Storing too many of a particular item also can be undesirable because the amount of space in a warehouse or store is finite—storing too many of an item that does not sell takes away space from items that do sell. Therefore, it would be desirable to have a system that can more accurately forecast the sales of items for a retailer or distributor.

BRIEF DESCRIPTION OF THE DRAWINGS

To facilitate further description of the embodiments, the following drawings are provided in which.

Figure 1:
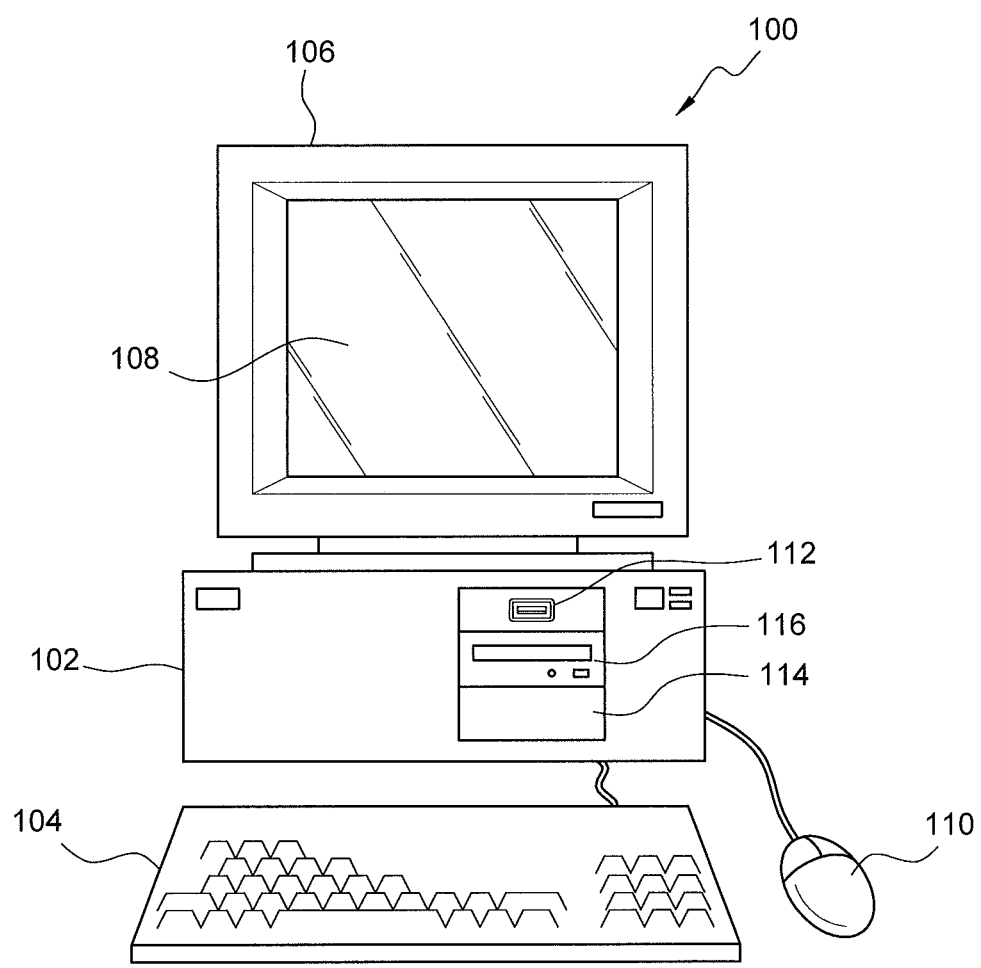
FIG. 1 illustrates a front elevation view of a computer system that is suitable for implementing an embodiment of the system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a method can comprise: receiving a request to produce a demand forecast for a stock keeping unit (SKU); placing the SKU in one or more clusters; calculating a cluster seasonality profile for each of the one or more clusters; calculating an item seasonality profile for the SKU; generating the demand forecast for the SKU; adjusting the demand forecast using the cluster seasonality profile for each of the one or more clusters and the item seasonality profile for the SKU; and ordering inventory based on the adjusted demand forecast.

In one embodiment, a system can comprise: a user input device; a display device; one or more processing modules; and one or more non-transitory storage modules storing computing instructions configured to run on the one or more processing modules and perform the acts of: receiving a request to produce a demand forecast for a stock keeping unit (SKU); placing the SKU in one or more clusters; calculating a cluster seasonality profile for each of the one or more clusters; calculating an item seasonality profile for the SKU; generating a demand forecast for the SKU; adjusting the demand forecast using the cluster seasonality profile for each of the one or more clusters and the item seasonality profile for the SKU; and ordering inventory based on the adjusted demand forecast.

Further embodiments include at least one non-transitory memory storage module having computer instructions stored thereon executable by one or more processing modules to: receive a request to produce a demand forecast for a stock keeping unit (SKU); place the SKU in one or more clusters; calculate a cluster seasonality profile for each of the one or more clusters; calculate an item seasonality profile for the SKU; generate a demand forecast for the SKU; adjust the demand forecast using the cluster seasonality profile for each of the one or more clusters and the item seasonality profile for the SKU; and order inventory based on the adjusted demand forecast.

Figure 2:
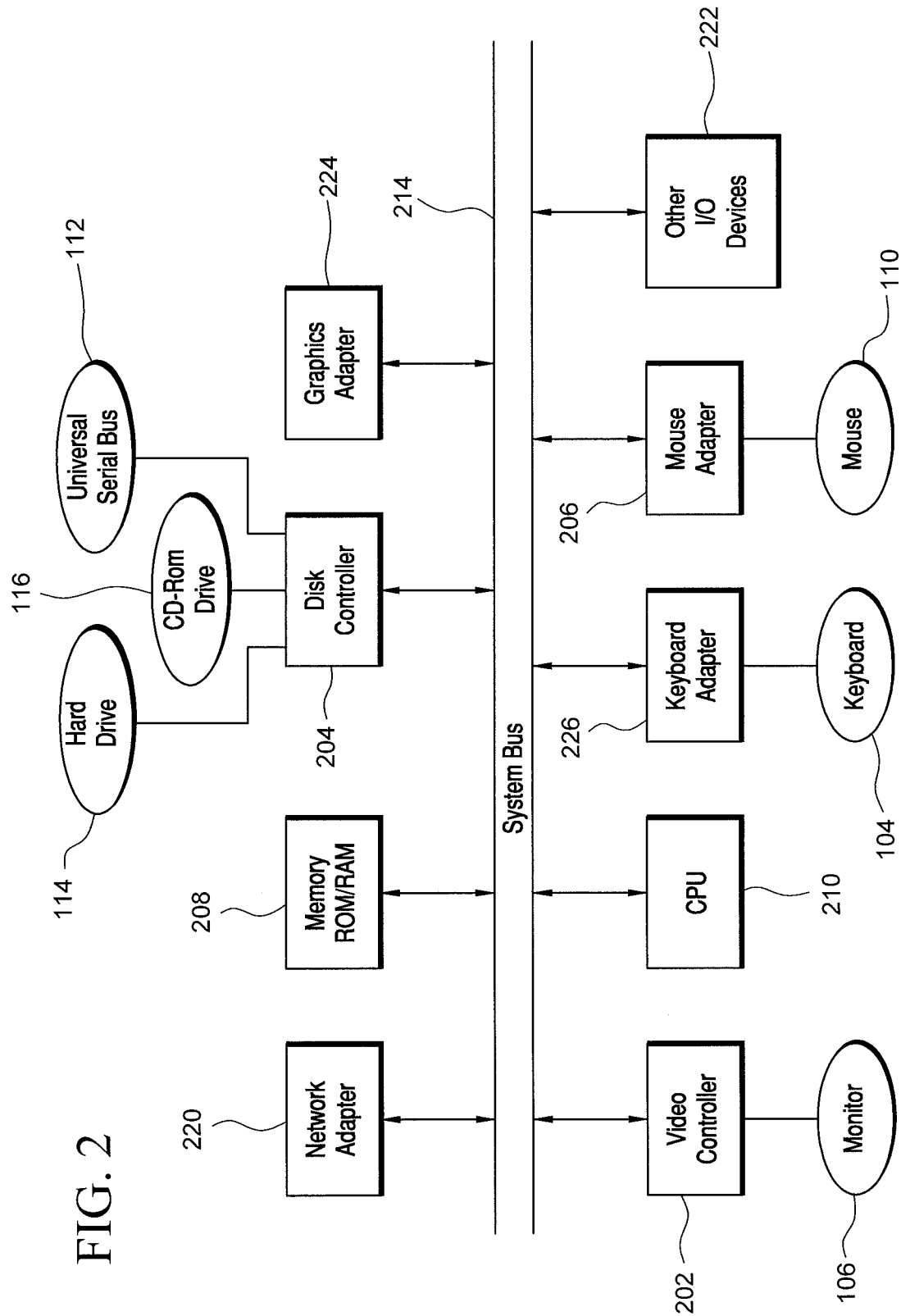
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) can also be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Forecasting is a key problem encountered in inventory planning for retailers and distributors. In order to buy inventory in advance, retailers or distributors would like an estimate of the number of units a distinct item for sale (also known as a stock keeping unit or a "SKU") is going to sell in a certain time period. To clarify the difference between an item and a SKU, an item might be, for example, an iPad, but each specific configuration of the iPad (screen size, memory size, color, radio, and the like) is a different SKU. Each SKU typically has a unique identifier. Buying fewer quantities of a SKU than is needed leads to lost sales opportunities, hence lower revenue, because items that could have been sold were not in stock. Buying too many of a particular SKU units also can lead to lost sales opportunities because the cost of buying the unused inventory might not be compensated for by income from other sales to customers, and can lead to lost opportunity costs (e.g., items that do not sell occupying space in a warehouse or store in place of items that could have been sold).

In general, a retailer or distributor wants to forecast the number of units it will sell so it can accurately purchase the units on a timely basis. One method of forecasting examines past sales of an item. Past sales can reveal both local level and seasonality patterns. Local level patterns refers to sales in the recent past, as sales of a certain SKU in the recent past can be important in forecasting future sales. Seasonality refers to periodic events that can influence sales. Seasonality can refer both to general seasonality (e.g., sales might be higher during the autumn because of the holiday season), and to product seasonality (e.g., some products are generally used only during certain times of the year.) For example, swimwear might be more popular in the summer, while Christmas decorations are more popular in the fall and winter.

Figure 4A:
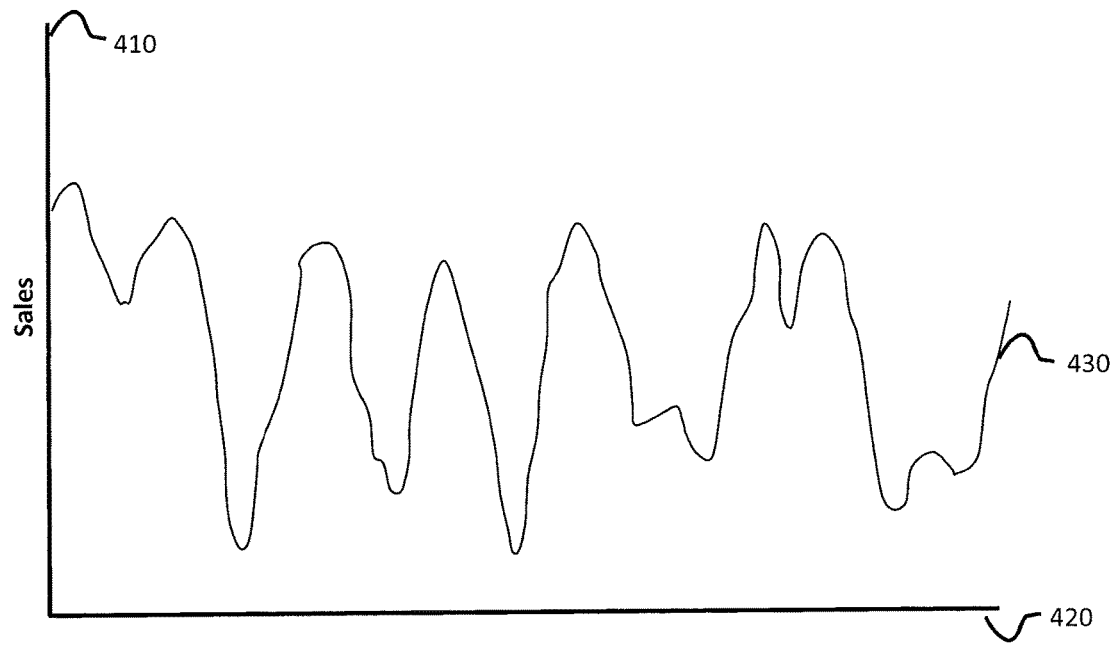
FIGS. 4A-4B illustrate an exemplary sales graph of a stock keeping unit.

With reference to FIG. 4A, a graph illustrating the sales of an exemplary product is illustrated. X-axis 420 is the time period for the sales. For example, FIG. 4A could be an annual graph, and each time period is weekly sales. In another embodiment, FIG. 4A could be a multi-year graph, and each time period could be monthly sales. Other combinations are also possible.

Y-axis 410 is the range of values for sales. Data series 430 represents the sales for each time period represented by X-axis 420. Y-axis 410 can be in a variety of different formats. In some embodiments, Y-axis 410 can represent actual sales. In some embodiments, Y-axis 410 can represent sales rankings. Using rankings as opposed to actual sales can result in more reliable and accurate data in some embodiments. For modeling purposes, two time-series can be considered similar if they rise and fall in unison. A rank correlation metric such as a Pearson correlation or a Spearman correlation can be used to measure similarity between time-series. For display purposes, Y-axis 410 can be linear or logarithmic.

As described above, a retailer would take data such as that illustrated in FIG. 4A and use the data to predict future sales. If the graph is relatively periodic, the retailer can forecast that more of the sales would occur during a certain time of the year and that fewer sales would occur during other times of the year. A few situations can occur that can make the use of such data to predict future sales difficult for some SKUs. For example, a possible situation can occur with electronic commerce ("eCommerce") retailers. Because eCommerce retailers generally store more SKUs than brick and mortar stores, there might not be enough sales data to model each SKU separately. In addition, eCommerce retailers often stock SKUs that are short-lived or have erratic data. For example, some eCommerce retailers have SKUs that sell out quickly, and there exists a time period where there is no data. In addition, there are SKUs that are short-lived, and thus there might not be available seasonal data from a previous year. Exemplary short-lived SKUs can include clothing (because of fashion trends, some items of clothing are sold only for a single season) and electronics (some forms of electronics, such as cell phone and TVs, are updated regularly, so a particular SKU might not have existed a year ago.)

Figure 4B:
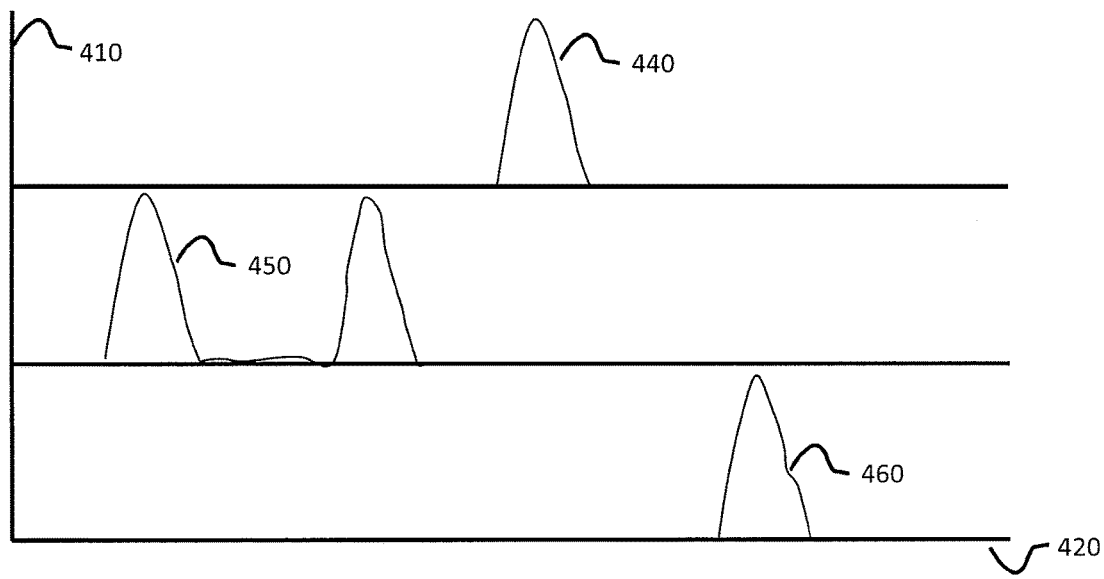

FIG. 4B illustrates three different SKUs that have such situations. The same X-axis 420 and Y-axis 410 that are present in FIG. 4A are present in FIG. 4B. Data series 440, data series 450, and data series 460 represent the sales of three different items. Data series 440 has incomplete data. Sales are present only for a very short time period, with no sales before or after that time period. This type of data series can be indicative of a short-lived item. Because the item had sales for only a very short-period of time, a popular but short-lived item might be indicative of a product that is no longer made. Data series 450 has two sales spikes, with a period of zero or otherwise low sales in between the sales spikes. Such a data series might be indicative of an item that could not keep up with demand (between the two spikes), and is no longer being made. Or such a data series might be indicative of a seasonal item (explaining the sales spikes) that is no longer being made (explaining the lack of data after the second sales spike). Data series 460 is similar to data series 440 in that it has only a single spike. However, while data series 440 is similar to data series 430 in that a peak for data series 430 roughly coincides with a peak of data series 440, data series 460 has a peak that roughly coincides with a trough of data series 430. This fact can indicate both that the item in data series 460 is a short-lived item and that its sales do not correlate well with the item represented by data series 430.

There are several different methods that can be used to generate demand forecasts for SKUs. Some methods involve placing a SKU in a cluster of SKUs and generating a forecast for the cluster of SKUs. Thereafter, one can use the forecast to order an appropriate number of the SKUs for a retailer or distributor. Other methods also can be used. However, many of the above-described techniques are most effective for SKUs that have a relatively large number of sales. There are items that have an intermediate number of sales. These intermediate sellers (for example, items that sell, at most, 5 to 13 units per time period) can be difficult to forecast using certain of the above-techniques. High-sellers can be forecasted using dynamic linear models or other techniques that can lead to fairly reliable results. Unfortunately, many dynamic linear models do not work well unless there is a minimum amount of data.

One problem that is of interest to forecast is seasonality data. As explained above with respect to FIGS. 4A and 4B, seasonality in terms of retail sales includes SKUs that have periodic sales increases during certain times of the year and sales decreases during other times of the year. Many different types of SKUs can exhibit seasonality. Obvious examples can include items specific to a holiday (e.g., Christmas, Thanksgiving, Halloween, and Valentine's Day) and items specific to a time of year (e.g., snow shovels, leaf rakes, swimwear).

With intermediate sellers, a problem that can occur is that there might not be enough data to make an accurate forecast that indicates seasonality.

Figure 3:
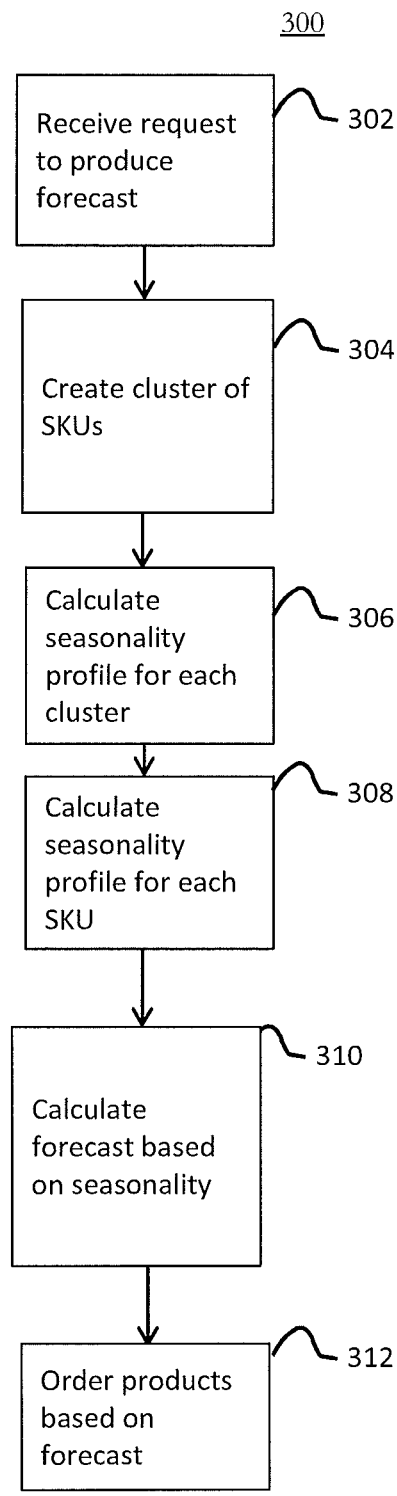
FIG. 3 is a flowchart illustrating the operation of a method of forecasting sales.

A flowchart illustrating the operation of a method 300 of adjusting a demand forecast is presented in FIG. 3. Method 300 is merely exemplary and is not limited to the embodiments presented herein. Method 300 can be employed in many different embodiments or examples not specifically depicted or described herein. In some embodiments, the procedures, the processes and/or the activities of method 300 can be performed in the order presented. In other embodiments, the procedures, the processes, and/or the activities of method 300 can be performed in any other suitable order. In still other embodiments, one or more of the procedures, the processes, and/or the activities of method 300 can be combined or skipped. In some embodiments, method 300 can be implemented by computer system 100 (FIG. 1).

A request to produce a demand forecast for an intermediate-selling SKU is received (block 302). Thereafter, clustering can be performed (block 304). For SKUs with intermediate sales various clustering methods can be applied, while some clustering methods used with high-selling items might not be applicable. Multiple clustering methods can be used. For example, SKUs can be clustered based on sub-category. On many eCommerce sites, items are grouped into categories and subcategories. For example, there might be a category for Sports & Outdoors and a category for Electronics and Office. With the Sports and Outdoors category, there can be a variety of different sub-categories, such as Cycling, Treadmills, and Golf Each sub-category can be further broken into other sub-categories. For example, the Cycling sub-category might be broken further into Bicycles, Lights, and Locks. An embodiment might use a sub-category for a clustering method. Another clustering method might be based on text information, a process sometimes referred to as semantics. Semantics can use data contained in the description of each SKU for comparison purposes. This type of use of semantics can be as narrow or as broad as a designer might want. In some embodiments, there might be approximately 22 different clusters based on semantics and approximately 9 different clusters based on category and sub-categories. Other clustering methods of other embodiments can use different numbers of clusters.

Thereafter, a seasonality profile is calculated for each cluster (block 306). In some embodiments, the seasonality profile is created using a Mixed-Effect Model:

$$Y = X\beta + Z\mu + \varepsilon$$

In this equation, Y is a known vector of the historical sales data of all SKUs in one cluster. The term $X\beta$ is the "fixed effect" term, $Z\mu$ is the "random effect" term, and $\varepsilon$ is the error term. In general, a fixed effect is an independent variable that would normally be included in an analysis. More particularly, X and Z are known design matrices relating Y to $\beta$ and $\mu$ respectively, $\beta$ is an unknown vector of fixed effects representing a seasonality of a cluster, and $\mu$ is an unknown vector of random effects representing a seasonality of the SKU.

In embodiments using two clusters, the X term may be a design matrix of two columns, W and V. W and V represent the seasonalities of the two clustering methods. In particular, W and V are the seasonality coefficients.

Y is a known vector of historical sales of all SKUs in one group, so these SKUs can belong to different clusters under the two clustering methods. Hence, the W and V terms consist of different clustering seasonality profiles under the same clustering method. The following equation provides the weights of the two clustering methods:

$$\beta = (\beta_1 \beta_2)^T$$

If $\beta 2 > \beta 1$, then the second clustering method has a better ability to explain the cluster's seasonality. All SKUs have the same $\beta$, but each SKU has a corresponding $\mu$ which gives the adjusted weight for each SKU.

The mixed-effect model could be expanded in a similar manner to account for additional methods of clustering data.

In general, the "random effect" term is the variable specific to the data sample. In particular, "random effect" is the individual seasonality for the SKU.

As explained above, there can be a variety of different clusters for each SKU. In other words, each SKU can belong to more than one cluster. In such a case, the seasonality of each cluster is determined. The determination of seasonality of each cluster can be done in a variety of different manners. Overall, the determination of seasonality of each cluster is intended to find out when a particular cluster is popular and when it is not popular, and adjust items forecasts due to the seasonal popularity. Exemplary methods for determining seasonality of a cluster include the following: ordinary linear regression, historical average sales, spline basis, and the like. These methods can operate best with balanced data or on many observations, which might not be the case for intermediate data.

After the "fixed effect" term has been calculated for the clusters, the seasonality profile for the SKU is calculated (block 308). This seasonality profile can be calculated in one of a variety of different methods, as described above.

Now that the two seasonality terms have been calculated (one for the clusters in which the SKU belongs and one for the SKU itself), the forecast is generated (block 310). The forecast can be generated using one of a variety of different techniques, such as a moving average technique. Thereafter, the seasonality components can be used to adjust the forecasts. Once the adjusted forecast has been developed, inventory can be ordered based on the forecasts (block 312).

Figure 5:
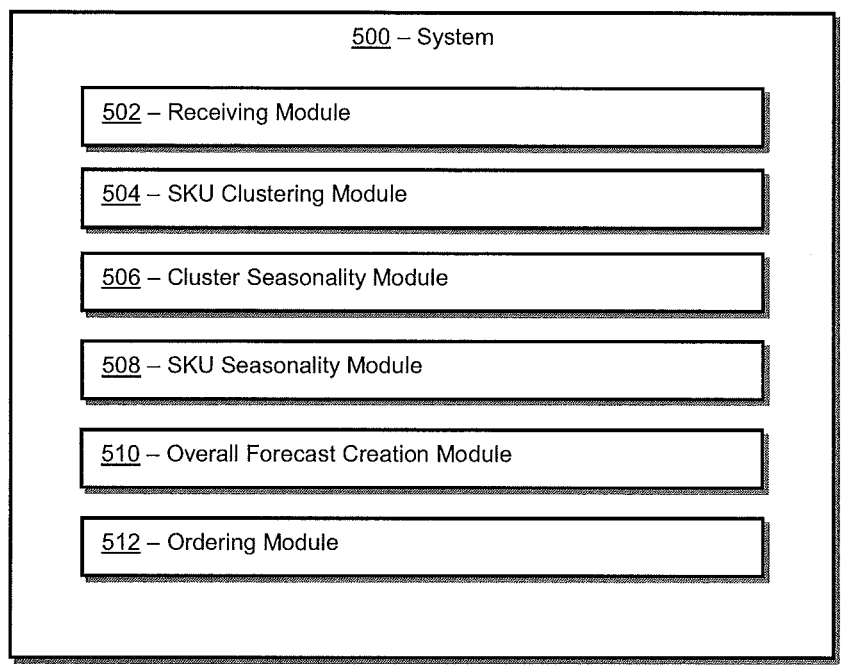
FIG. 5 is a block diagram illustrating a system capable of performing a method of forecasting sales.

Turning ahead in the figures, FIG. 5 illustrates a block diagram of a system 500 that is capable of performing disclosed embodiments. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules.

In a number of embodiments, system 500 can include receiving module 502. In certain embodiments, receiving module 502 can perform block 302 (FIG. 3) of receiving a request to produce a forecast for a SKU.

In a number of embodiments, system 500 can include SKU clustering module 504. In certain embodiments, SKU clustering module 504 can perform block 304 (FIG. 3) of creating clusters of SKUs.

System 500 can include cluster seasonality module 506. In certain embodiments, cluster seasonality module 506 can perform block 306 of calculating a seasonality profile for each cluster.

System 500 can include SKU seasonality module 508. In certain embodiments, SKU seasonality module 508 can perform block 308 of calculating a seasonality profile for each SKU.

System 500 can include overall forecast creation module 510. In certain embodiments, overall forecast creation module 510 can perform block 310 of creating a forecast for a SKUs based on the seasonality of the clusters to which the SKU belongs and also based on the seasonality of the SKU.

System 500 can include ordering module 512. In certain embodiments, ordering module 512 can perform block 312 of ordering products based on the created forecast.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 can be modified, and that the foregoing discussion of certain of these embodiments does not necessarily represent a complete description of all possible embodiments. For example, one or more of the procedures, processes, or activities of FIGS. 1-5 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:

receiving, at a processing module from a computer network adapter via a computer system BUS, a request to produce a demand forecast for a stock keeping unit (SKU) from multiple sources;

clustering, using the processing module, the SKU with one or more additional SKUs in one or more clusters of SKUs based on (1) item categories associated with the SKU and the one or more additional SKUs and (2) semantic text information in a description for the SKU and the one or more additional SKUs;

for each cluster of SKUs of the one or more clusters of SKUs, calculating, in real time using the processing module and a first set of rules, a cluster seasonality profile for each cluster, wherein the first set of rules comprise computing instructions stored on one or more non-transitory storage modules;

storing the cluster seasonality profile for the cluster in the one or more non-transitory storage modules via the computer system BUS;

accessing the one or more non-transitory storage modules to calculate, in real time using the processing module and a second set of rules, an item seasonality profile for the SKU, wherein the second set of rules comprise computing instructions stored on the one or more non-transitory storage modules;

generating, in real time using the processing module and a third set of rules, the demand forecast for the SKU, wherein the third set of rules comprise computing instructions stored on the one or more non-transitory storage modules;

adjusting, in real time using the processing module, the demand forecast for the SKU using (1) the cluster seasonality profile for each cluster of SKUs of the one or more clusters of SKUs and (2) the item seasonality profile for the SKU;

ordering inventory for the SKU based on the demand forecast for the SKU, as adjusted, by transmitting the demand forecast from the processing module over the computer system BUS to the computer network adapter and over a computer network to an inventory system; and in response to ordering the inventory, receiving the inventory at a warehouse or a brick and mortar store.

2. The method of claim 1, wherein:

the first set of rules comprises:

a mixed effect model, the mixed-effect model using an equation $Y=X\beta+Z\mu+\varepsilon$, where Y is a known vector of historical sales data of the SKU and the one or more additional SKUs in a cluster of SKUs of the one or more clusters of SKUs, X is a known design matrix relating $\beta$ to Y, Z is a known design matrix relating Y to $\mu$, $\beta$ is a coefficient representing a seasonality of the cluster of SKUs of the one or more clusters of SKUs, $\mu$ is a coefficient representing a seasonality of the SKU, and $\varepsilon$ is an error term.

3. The method of claim 2, wherein:

the $\beta$ coefficient represents a weighting for sales data for the cluster over a one week period of time; and the $\mu$ coefficient represents a weighting for the historical sales data for the SKU over the one week period of time.

4. The method of claim 2, wherein:
the X matrix is a matrix of two different clustering methods; and
the β coefficient represents a seasonality of two or more clusters, calculated using an equation $\beta=(\beta_1\beta_2)^T$, where $\beta_1$ is a seasonality of a first cluster and $\beta_2$ is a seasonality of a second cluster.

5. The method of claim 1, wherein:
generating, in real time using the processing module and the third set of rules, the demand forecast for the SKU comprises using a moving average technique to estimate the demand forecast for the SKU.

6. The method of claim 1, wherein:
calculating, in real time using the processing module and the second set of rules, the item seasonality profile for the SKU comprises:
using a mixed-effect model to calculate the item seasonality profile for the SKU.

7. The method of claim 1, wherein:
the first set of rules comprises:
a mixed effect model, the mixed-effect model using an equation $Y=X\beta+Z\mu+\varepsilon$, where Y is a known vector of historical sales data of the SKU and the one or more additional SKUs in a cluster of SKUs of the one or more clusters of SKUs, X is a known design matrix relating β to Y, Z is a known design matrix relating Y to μ, β is a coefficient representing a seasonality of the cluster of SKUs of the one or more clusters of SKUs, μ is a coefficient representing a seasonality of the SKU, and ε is an error term;
the X matrix is a matrix of two different clustering methods;
the β coefficient represents a seasonality of two or more clusters, calculated using an equation $\beta=(\beta_1\beta_2)^T$, where $\beta_1$ is a seasonality of a first cluster and $\beta_2$ is a seasonality of a second cluster;
generating, in real time using the processing module and the third set of rules, the demand forecast for the SKU comprises using a moving average technique to estimate the demand forecast for the SKU; and
calculating, in real time using the processing module and the second set of rules, the item seasonality profile for the SKU comprises using a mixed-effect model to calculate the item seasonality profile for the SKU.

8. A system comprising:
a user input device;
a display device;
one or more processing modules; and
one or more non-transitory storage modules storing computing instructions configured to run on the one or more processing modules and perform acts of:
receiving, from a computer network adapter via a computer system BUS, a request to produce a demand forecast for a stock keeping unit (SKU) from multiple sources;
clustering the SKU with one or more additional SKUs in one or more clusters of SKUs based on (1) item categories associated with the SKU and the one or more additional SKUs and (2) semantic text information in a description for the SKU and the one or more additional SKUs;
for each cluster of SKUs of the one or more clusters of SKUs, calculating, in real time using a first set of rules, a cluster seasonality profile for each cluster, wherein the first set of rules comprise computer implemented instructions stored on the one or more non-transitory storage modules;
storing the cluster seasonality profile for the cluster in the one or more non-transitory storage modules via the computer system BUS;
accessing the one or more non-transitory storage modules to calculate, in real time using a second set of rules, an item seasonality profile for the SKU, wherein the second set of rules comprise computer implemented instructions stored on the one or more non-transitory storage modules;
generating, in real time using a third set of rules, the demand forecast for the SKU, wherein the third set of rules comprise computer implemented instructions stored on the one or more non-transitory storage modules;
adjusting, in real time, the demand forecast for the SKU using (1) the cluster seasonality profile for each cluster of SKUs of the one or more clusters of SKUs and (2) the item seasonality profile for the SKU;
ordering inventory based on the demand forecast for the SKU, as adjusted, by transmitting the demand forecast from the one or more processing modules over the computer system BUS to the computer network adapter and over a computer network to an inventory system; and
in response to ordering the inventory, receiving the inventory at a warehouse or a brick and mortar store.

9. The system of claim 8, wherein:
the first set of rules comprises:
a mixed effect model, the mixed-effect model using an equation $Y=X\beta+Z\mu+\varepsilon$, where Y is a known vector of historical sales data of the SKU and the one or more additional SKUs in a cluster of SKUs of the one or more clusters of SKUs, X is a known design matrix relating β to Y, Z is a known design matrix relating Y to μ, β is a coefficient representing a seasonality of the cluster of SKUs of the one or more clusters of SKUs, μ is a coefficient representing a seasonality of the SKU, and ε is an error term.

10. The system of claim 9, wherein:
the β coefficient represents a weighting for sales data for the cluster over a one week period of time; and
the μ coefficient represents a weighting for the historical sales data for the SKU over the one week period of time.

11. The system of claim 9, wherein:
the X matrix is a matrix of two different clustering methods; and
the β coefficient represents a seasonality of two or more clusters, calculated using an equation $\beta=(\beta_1\beta_2)^T$, where $\beta_1$ is a seasonality of a first cluster and $\beta_2$ is a seasonality of a second cluster.

12. The system of claim 8, wherein:
generating, in real time using the third set of rules, the demand forecast for the SKU comprises using a moving average technique to estimate the demand forecast for the SKU.

13. The system of claim 8, wherein:
calculating, in real time using the second set of rules, the item seasonality profile for the SKU comprises:
using a mixed-effect model to calculate the item seasonality profile for the SKU.

14. The system of claim 8, wherein:
the first set of rules comprises:
a mixed effect model, the mixed-effect model using an equation $Y=X\beta+Z\mu+\varepsilon$, where Y is a known vector of historical sales data of the SKU and the one or more additional SKUs in a cluster of SKUs of the one or more clusters of SKUs, X is a known design matrix relating $\beta$ to Y, Z is a known design matrix relating Y to $\mu$, $\beta$ is a coefficient representing a seasonality of the cluster of SKUs of the one or more clusters of SKUs, $\mu$ is a coefficient representing a seasonality of the SKU, and $\varepsilon$ is an error term;

the X matrix is a matrix of two different clustering methods;

the $\beta$ coefficient represents a seasonality of two or more clusters, calculated using an equation $\beta=(\beta_1\beta_2)^T$, where $\beta_1$ is a seasonality of a first cluster and $\beta_2$ is a seasonality of a second cluster;

generating, in real time using the third set of rules, the demand forecast for the SKU comprises using a moving average technique to estimate the demand forecast for the SKU; and calculating, in real time using the second set of rules, the item seasonality profile for the SKU comprises using a mixed-effect model to calculate the item seasonality profile for the SKU.

15. At least one non-transitory memory storage module having computer instructions stored thereon executable by one or more processing modules to:

receive, from a computer network adapter via a computer system BUS a request to produce a demand forecast for a stock keeping unit (SKU) from multiple sources;

cluster the SKU with one or more additional SKUs in one or more clusters of SKUs based on (1) item categories associated with the SKU and the one or more additional SKUs and (2) semantic text information in a description for the SKU and the one or more additional SKUs;

for each cluster of SKUs of the one or more clusters of SKUs, calculate, in real time using a first set of rules, a cluster seasonality profile for each cluster, wherein the first set of rules comprise computing instructions stored on the at least one non-transitory memory storage module;

store the cluster seasonality profile for the cluster in the at least one non-transitory memory storage module via the computer system BUS;

access the at least one non-transitory memory storage module to calculate, in real time using a second set of rules, an item seasonality profile for the SKU, wherein the second set of rules comprise computing instructions stored on the at least one non-transitory memory storage module;

generate, in real time using a third set of rules, the demand forecast for the SKU, wherein the third set of rules comprise computing instructions stored on the at least one non-transitory memory storage module;

adjust, in real time, the demand forecast for the SKU using (1) the cluster seasonality profile for each cluster of SKUs of the one or more clusters of SKUs and (2) the item seasonality profile for the SKU;

order inventory based on the demand forecast for the SKU, as adjusted, by transmitting the demand forecast from the one or more processing modules over the computer system BUS to a computer network adapter and over the computer network to an inventory system; and in response to ordering the inventory, receive the inventory at a warehouse or a brick and mortar store.

16. The at least one non-transitory memory storage module of claim 15, wherein:

the first set of rules comprises:

a mixed effect model, the mixed-effect model using an equation $Y=X\beta+Z\mu+\varepsilon$, where Y is a known vector of historical sales data of the SKU and the one or more additional SKUs in a cluster of SKUs of the one or more clusters of SKUs, X is a known design matrix relating $\beta$ to Y, Z is a known design matrix relating Y to $\mu$, $\beta$ is a coefficient representing a seasonality of the cluster of SKUs of the one or more clusters of SKUs, $\mu$ is a coefficient representing a seasonality of the SKU, and $\varepsilon$ is an error term.

17. The at least one non-transitory memory storage module of claim 16, wherein:

the $\beta$ coefficient represents a weighting for sales data for the cluster over a one week period of time; and the $\mu$ coefficient represents a weighting for the historical sales data for the SKU over the one week period of time.

18. The at least one non-transitory memory storage module of claim 16, wherein:

the X matrix is a matrix of two different clustering methods; and the $\beta$ coefficient represents a seasonality of two or more clusters, calculated using an equation $\beta=(\beta_1\beta_2)^T$, where $\beta_1$ is a seasonality of a first cluster and $\beta_2$ is a seasonality of a second cluster.

19. The at least one non-transitory memory storage module of claim 15, wherein:

generate, in real time using the third set of rules, the demand forecast for the SKU comprises use a moving average technique to estimate the demand forecast for the SKU.

20. The at least one non-transitory memory storage module of claim 15, wherein:

calculate, in real time using the second set of rules, the item seasonality profile for the SKU comprises:

use a mixed-effect model to calculate the item seasonality profile for the SKU.

21. The at least one non-transitory memory storage module of claim 15, wherein:

the first set of rules comprises:

a mixed effect model, the mixed-effect model using an equation $Y=X\beta+Z\mu+\varepsilon$, where Y is a known vector of historical sales data of the SKU and the one or more additional SKUs in a cluster of SKUs of the one or more clusters of SKUs, X is a known design matrix relating $\beta$ to Y, Z is a known design matrix relating Y to $\mu$, $\beta$ is a coefficient representing a seasonality of the cluster of SKUs of the one or more clusters of SKUs, $\mu$ is a coefficient representing a seasonality of the SKU, and $\varepsilon$ is an error term;

the X matrix is a matrix of two different clustering methods;

the $\beta$ coefficient represents a seasonality of two or more clusters, calculated using an equation $\beta=(\beta_1\beta_2)^T$, where $\beta_1$ is a seasonality of a first cluster and $\beta_2$ is a seasonality of a second cluster;

generate, in real time using the third set of rules, the demand forecast for the SKU comprises use a moving average technique to estimate the demand forecast for the SKU; and calculate, in real time using the second set of rules, the item seasonality profile for the SKU comprises use a mixed-effect model to calculate the item seasonality profile for the SKU.

* * * * *